May 11, 1926.

G. FREELAND

LUNCH BUCKET

Filed Sept. 10, 1924

1,583,920

INVENTOR.
Gus Freeland
BY J. M. Thomas
ATTORNEY.

Patented May 11, 1926.

1,583,920

UNITED STATES PATENT OFFICE.

GUS FREELAND, OF KENILWORTH, UTAH.

LUNCH BUCKET.

Application filed September 10, 1924. Serial No. 736,911.

My invention relates to receptacles in which lunches are carried, and has for its object to provide a new lunch basket having individual compartments in which may be carried a generous supply of drinking water, a thermos bottle, a sealed can for fresh fruit or salad, and a receptacle for the solid portions of the lunch, all of which are compactly placed within a covered bucket.

These objects I accomplish with the device illustrated in the accompanying drawings in which similar letters of reference indicate like parts throughout the several views, and as described in the specification forming a part of this application and pointed out in the appended claim.

Figure 1:
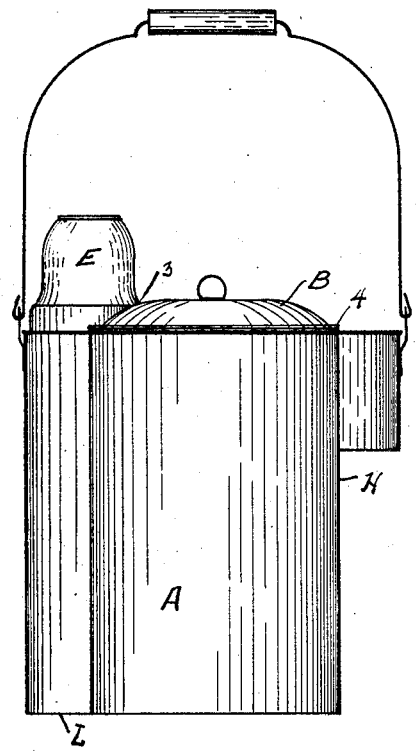
Figure 2:
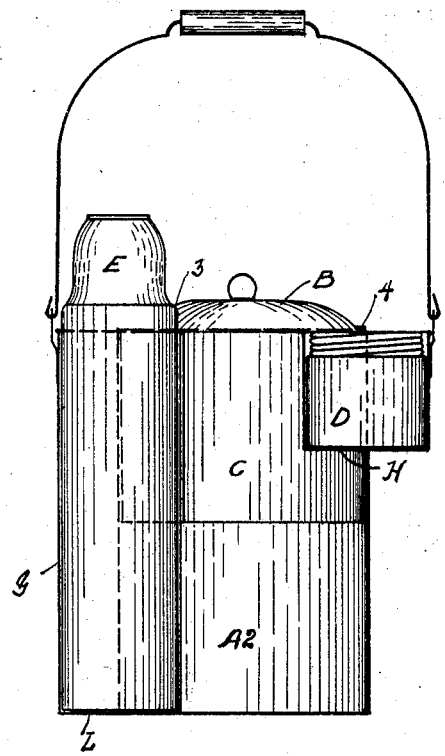
Figure 3:
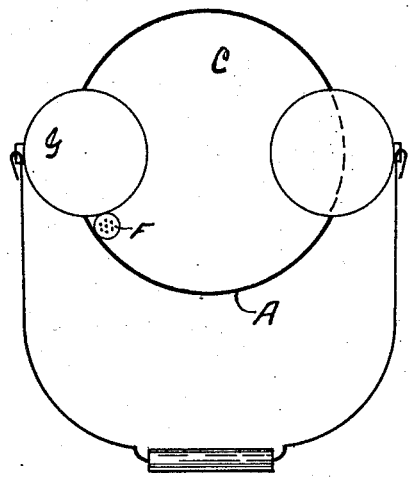

In the drawings in which I have shown the best manner of using and constructing the invention, Figure 1 is an elevation of the device with the bail raised. Figure 2 is a vertical section cutting diametrically through the device. Figure 3 is a plan view of the device with the cover removed.

The present invention consists of a bucket A, having a cover B with portions of the side wall H of the bucket and cover cut away to allow a thermos bottle E to be carried in the bucket, and a sealed can D on the opposite side from the bottle. The bottom of the bucket has an extended wing L which forms the bottom of the thermos bottle chamber G. The remaining lower portion of the chamber or interior $A^2$ of said bucket A is used to carry liquid refreshments, such as water or milk as desired, while the more solid portions of the lunch are carried in the metal receptacle C which telescopes and is carried in the upper part of the said bucket. A part of the said cover B bears against the cover of the sealed can D and a shoulder of the thermos bottle E, as shown at 3 and 4.

One of the convenient features of my bucket is that every part is easy to wash and keep clean, and the water supply is ample for one shift in mines and other places where drinking water is not so conveniently secured.

Having described my invention and its use I desire to secure by Letters Patent and claim:—

A lunch bucket comprising a cylindrically shaped bucket; an extension chamber in one side of said bucket; a receptacle carried in said extension chamber having a bell shaped upper portion extending above the upper edge of said bucket; an extension chamber in the side of said bucket diametrically opposed to the first mentioned extension chamber; a sealed can carried in the last mentioned extension chamber with its upper edge on a level with said bucket; and a lunch receptacle telescoped within said bucket with its bottom spaced from the bottom of said bucket forming a liquid chamber below the lunch receptacle; with a cover for said bucket adapted to bear against the bell shaped upper portion of the first mentioned receptacle, and on the cover of said sealed can to hold them in place.

In testimony whereof I have affixed my signature.

GUS FREELAND.